(12) United States Patent
Lee et al.

(10) Patent No.: US 9,153,262 B1
(45) Date of Patent: Oct. 6, 2015

(54) DISK DRIVE ACTUATOR HAVING A RADIALLY STEPPED PIVOT BORE

(71) Applicant: Western Digital Technologies, Inc., Irvine, CA (US)

(72) Inventors: Yu-Min Lee, Saratoga, CA (US); Hao Zheng, San Jose, CA (US); Ian Griggs, Cupertino, CA (US); Gregory Tran, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/669,931

(22) Filed: Mar. 26, 2015

(51) Int. Cl.
*G11B 5/48* (2006.01)

(52) U.S. Cl.
CPC .................................... *G11B 5/4873* (2013.01)

(58) Field of Classification Search
CPC .. G11B 5/4813; G11B 25/043; G11B 5/5521; G11B 33/08; G11B 5/4806
USPC ....................................................... 360/265.6
See application file for complete search history.

(56) References Cited

U.S. PATENT DOCUMENTS

| | | | |
|---|---|---|---|
| 5,235,482 A | 8/1993 | Schmitz | |
| 6,018,441 A * | 1/2000 | Wu et al. .................... | 360/265.6 |
| 6,046,889 A | 4/2000 | Berding et al. | |
| 6,052,890 A | 4/2000 | Malagrino, Jr. et al. | |
| 6,061,206 A | 5/2000 | Foisy et al. | |
| 6,101,876 A | 8/2000 | Brooks et al. | |
| 6,147,831 A | 11/2000 | Kennedy et al. | |
| 6,151,189 A | 11/2000 | Brooks | |
| 6,151,197 A | 11/2000 | Larson et al. | |
| 6,185,067 B1 | 2/2001 | Chamberlain | |
| 6,185,074 B1 | 2/2001 | Wang et al. | |
| 6,208,486 B1 | 3/2001 | Gustafson et al. | |
| 6,215,616 B1 | 4/2001 | Phan et al. | |
| 6,256,173 B1 * | 7/2001 | Chee et al. ................. | 360/265.7 |
| 6,272,694 B1 | 8/2001 | Knoth | |
| 6,288,866 B1 | 9/2001 | Butler et al. | |
| 6,292,333 B1 | 9/2001 | Blumentritt et al. | |
| 6,344,950 B1 | 2/2002 | Watson et al. | |
| 6,349,464 B1 | 2/2002 | Codilian et al. | |
| 6,388,873 B1 | 5/2002 | Brooks et al. | |
| 6,417,979 B1 | 7/2002 | Patton, III et al. | |
| 6,421,208 B1 | 7/2002 | Oveyssi | |
| 6,441,998 B1 | 8/2002 | Abrahamson | |
| 6,462,914 B1 | 10/2002 | Oveyssi et al. | |
| 6,466,398 B1 | 10/2002 | Butler et al. | |
| 6,469,871 B1 | 10/2002 | Wang | |
| 6,502,300 B1 | 1/2003 | Casey et al. | |
| 6,519,116 B1 | 2/2003 | Lin et al. | |
| 6,529,345 B1 | 3/2003 | Butler et al. | |
| 6,529,351 B1 | 3/2003 | Oveyssi et al. | |
| 6,535,358 B1 | 3/2003 | Hauert et al. | |
| 6,545,382 B1 | 4/2003 | Bennett | |

(Continued)

Primary Examiner — Mark Blouin (57) ABSTRACT

A head stack assembly (HSA) for a disk drive includes an actuator body having a cylindrical bore therethrough and an actuator arm extending therefrom. A head is attached to a distal end of the actuator arm. A pivot bearing cartridge is disposed within the cylindrical bore. A tolerance band is radially preloaded between an outer surface of the pivot bearing cartridge and an inner surface of the cylindrical bore. The cylindrical bore has a first diameter in a first region adjacent a first axial end, and a second diameter in a second region adjacent a second axial end. There is a radial step between the first and second regions. The first diameter is greater than the second diameter by at least 20 microns but no more than 100 microns.

20 Claims, 5 Drawing Sheets

(56) References Cited

U.S. PATENT DOCUMENTS

| | | |
|---|---|---|
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,054,111 B2 | 5/2006 | Dominguez, Jr. et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,355,819 B2 | 4/2008 | Koester et al. |

(56) References Cited

U.S. PATENT DOCUMENTS

| | | |
|---|---|---|
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,580,225 B2 * | 8/2009 | Hanrahan et al. .......... 360/265.6 |
| 7,583,476 B2 * | 9/2009 | Hanrahan et al. .......... 360/265.6 |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 * | 12/2009 | Larson et al. ............. 360/265.2 |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,952,837 B1 * | 5/2011 | Dobosz et al. ............. 360/265.4 |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,144,434 B1 * | 3/2012 | Arnone et al. ............. 360/265.6 |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,284,523 B2 * | 10/2012 | Schmidt et al. ............ 360/265.6 |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,385,024 B2 * | 2/2013 | Schmidt et al. ............ 360/265.6 |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 * | 10/2013 | Foisy et al. ............... 360/265.2 |
| 8,553,356 B1 | 10/2013 | Heo et al. |
| 8,553,366 B1 * | 10/2013 | Hanke ....................... 360/264.2 |
| 8,553,367 B1 | 10/2013 | Foisy et al. |
| 8,615,318 B2 | 12/2013 | Bancalari |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 8,792,205 B1 | 7/2014 | Boye-Doe et al. |
| 8,797,677 B2 | 8/2014 | Heo et al. |
| 8,797,689 B1 | 8/2014 | Pan et al. |
| 8,824,095 B1 | 9/2014 | Dougherty |
| 8,824,098 B1 | 9/2014 | Huang et al. |
| 2011/0212281 A1 | 9/2011 | Jacoby et al. |
| 2013/0038964 A1 | 2/2013 | Garbarino et al. |
| 2013/0091698 A1 | 4/2013 | Banshak, Jr. et al. |
| 2013/0155546 A1 | 6/2013 | Heo et al. |
| 2013/0290988 A1 | 10/2013 | Watson et al. |

* cited by examiner

DISK DRIVE ACTUATOR HAVING A RADIALLY STEPPED PIVOT BORE

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write. For example, in an optical disk drive, the head will typically include a mirror and objective lens for reflecting and focusing a laser beam on to a surface of the disk.

In a modern magnetic hard disk drive device, each head is a sub-component of a head gimbal assembly (HGA) that typically includes a suspension assembly with a laminated flexure to carry the electrical signals to and from the head. The HGA, in turn, is a sub-component of a head stack assembly (HSA) that typically includes a plurality of HGAs, an actuator, and a flexible printed circuit (FPC) that includes a flex cable. The plurality of HGAs are attached to various arms of the actuator, and each of the laminated flexures of the HGAs has a flexure tail that is electrically connected to the FPC of the HSA.

In many disk drives, the actuator includes arms that position the heads, and that extend from an actuator body. The actuator body includes a bore into which a pivot bearing is fixed by a tolerance ring. Typically, tolerance rings include a cylindrical base portion and a plurality of contacting portions that are raised or recessed from the cylindrical base portion. The contacting portions are typically partially compressed during installation to create a radial preload between the mating cylindrical features of the parts joined by the tolerance ring. The radial preload compression provides frictional engagement that prevents axial slippage of the mating parts. For example, in disk drive applications, the radial compressive preload of the tolerance ring prevents separation and slippage at the interface between the actuator body and the pivot bearing during operation and during mechanical shock events. The tolerance ring also acts as a radial spring. In this way, the tolerance ring positions the interior cylindrical part relative to the exterior cylindrical part while making up for radial clearance and manufacturing variations in the radius of the parts.

The rotational position of the actuator body and arms about the pivot bearing may be changed and controlled, by a magnetic interaction between fixed magnets and an electromagnetic coil that extends from the actuator body in a direction that is generally opposite from the actuator arms. However, the protruding arms and coil may participate in mechanical resonances of the actuator, in a way somewhat reminiscent of a tuning fork. The actuator body may also participate in such a resonance by rocking against or about its attachment constraints.

Such actuator resonances may be excited by intentional rotational accelerations of the actuator about the pivot bearing and/or unintentional rotational or translational mechanical shocks to the actuator structure or its attachment. Any mechanical resonance of the actuator is generally undesirable, and may become problematic if it is characterized by a resonance frequency that is too closely aligned with an excitation and/or a resonance frequency of coupled structure, and/or if its amplitude becomes excessive.

Therefore, there is a need in the art for an improved actuator structure that may better control mechanical resonances of the actuator body and/or a protruding coil or arm.

DETAILED DESCRIPTION OF EXAMPLE EMBODIMENTS

Figure 1:
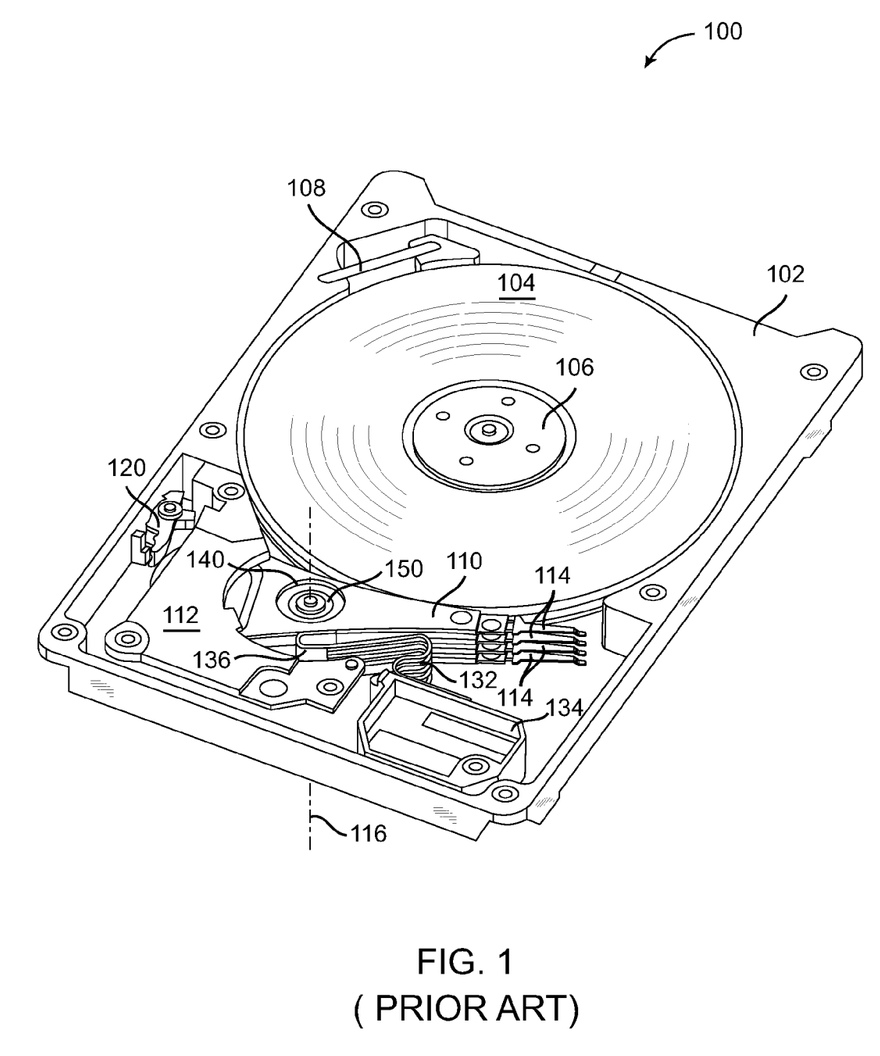
FIG. 1 is a perspective view of a conventional disk drive (without any cover shown so that interior parts may be viewed).

FIG. 1 is top perspective view of a conventional disk drive 100. The disk drive 100 includes a disk drive base 102 and two annular magnetic disks 104. The disks 104 include opposing disk surfaces which may include one or more magnetic layers. Data may be recorded along data tracks on a single disk surface or both. The disk drive 100 further includes a spindle 106, rotatably mounted on the disk drive base 102, for rotating the disks 104. The rotation of the disks 104 establishes air flow through recirculation filter 108. Disk drives like disk drive 100 may have only a single disk 104, or alternatively, two or more disks 104.

The disk drive 100 further includes an actuator 110 that is pivotably mounted on the disk drive base 102. Specifically, the actuator 110 is pivotably attached to the disk drive base 102 by a pivot bearing cartridge 150 that is disposed within a cylindrical bore 140 of the actuator 110. Voice coil motor 112 rotates the actuator 110 through a limited angular range about an actuator pivot axis 116, so that at least one head gimbal assembly (HGA) 114 is desirably positioned relative to one or more tracks of information on a corresponding one of the disks 104. The actuator 110 may occasionally be latched at an extreme angular position within the limited angular range, by latch 120.

The disk drive of FIG. 1 includes four HGAs 114, each of which corresponds to a surface of one of the two disks 104. However fewer or more HGAs may be included depending on the number of disks 104 that are included and whether the disk drive 100 is depopulated. Each HGA 114 includes a read head (too small to be depicted in FIG. 1) with a transducer for at least reading data from a disk surface. The transducer may include both a read element and a writer, but the term read head will be used herein to refer to any head that can read, even if it also performs other functions such as writing, air bearing modulation, microactuation, etc. In optical and magneto-optical recording applications, the head may also include an objective lens and an active or passive mechanism for controlling the separation of the objective lens from a disk surface of the disk 104.

Electrical signals to/from the HGAs 114 are carried to other drive electronics via a flexible printed circuit, which includes a flex cable 132, a flex cable bracket 134 that is attached to the disk drive base 102, and a flex stiffener 136 that is attached to the body of the actuator 110. The flex cable 132 runs from the actuator 110 to the flex cable bracket 134. The flex cable bracket 134 may include a connector protruding from its underside, to electrically couple the flex cable 132 to a printed circuit board attached to the underside of the disk drive base 102 outside the disk drive enclosure.

Figure 2:
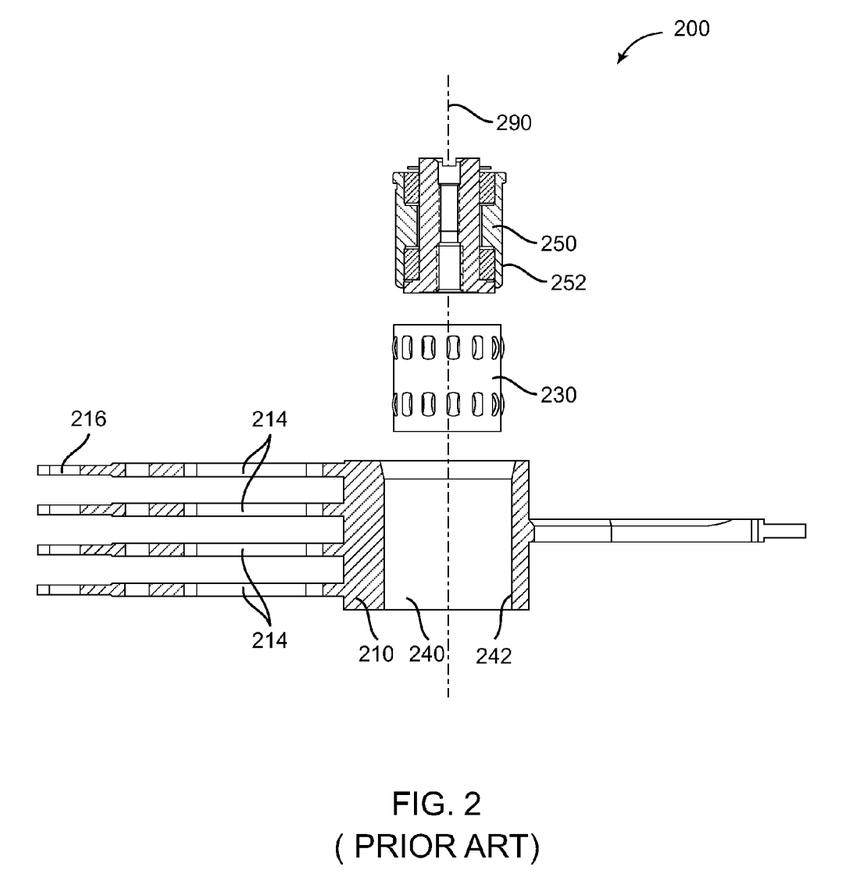
FIG. 2 is an exploded cross-sectional view of a conventional disk drive actuator assembly.

FIG. 2 is an exploded cross-sectional view of a conventional disk drive actuator assembly 200. In the example of FIG. 2, at least one actuator arm 214 protrudes from an actuator body 210 in a direction approximately normal to an actuator pivot axis 290. Optionally, the actuator body 210 may be cast or machined from a metal such as aluminum (e.g. an aluminum alloy). A distal end 216 of the actuator arm 214 is adapted for attachment of a read head, for example by conventional swaging of a head gimbal assembly that includes the read head.

As shown in FIG. 2, a tolerance ring 230 may be designed to fit outside of actuator pivot bearing cartridge 250 and inside a cylindrical bore 240 in an actuator arm body 210. In this context, a bore is considered cylindrical if it has at least one inner surface that is cylindrical. The pivot bearing cartridge 250 optionally has an outer sleeve (e.g. stainless steel). The "tolerance ring" 230 may sometimes be referred to as being an "interference band," and those terms are used synonymously herein.

As shown in FIG. 2, the tolerance ring 230 is forcibly installed in a radial clearance space between an outer surface 252 of the pivot bearing 250 and an inner surface 242 of the cylindrical bore 240 in the actuator body 210. A plurality of protruding bumps of the tolerance ring 230 are deformed (i.e. compressed) by a radial preload, when the tolerance ring 230 is forcibly installed into the radial clearance space between the outer surface 252 of the pivot bearing 250 and the inner surface 242 of the cylindrical bore 240 in the actuator body 210.

Figure 3:
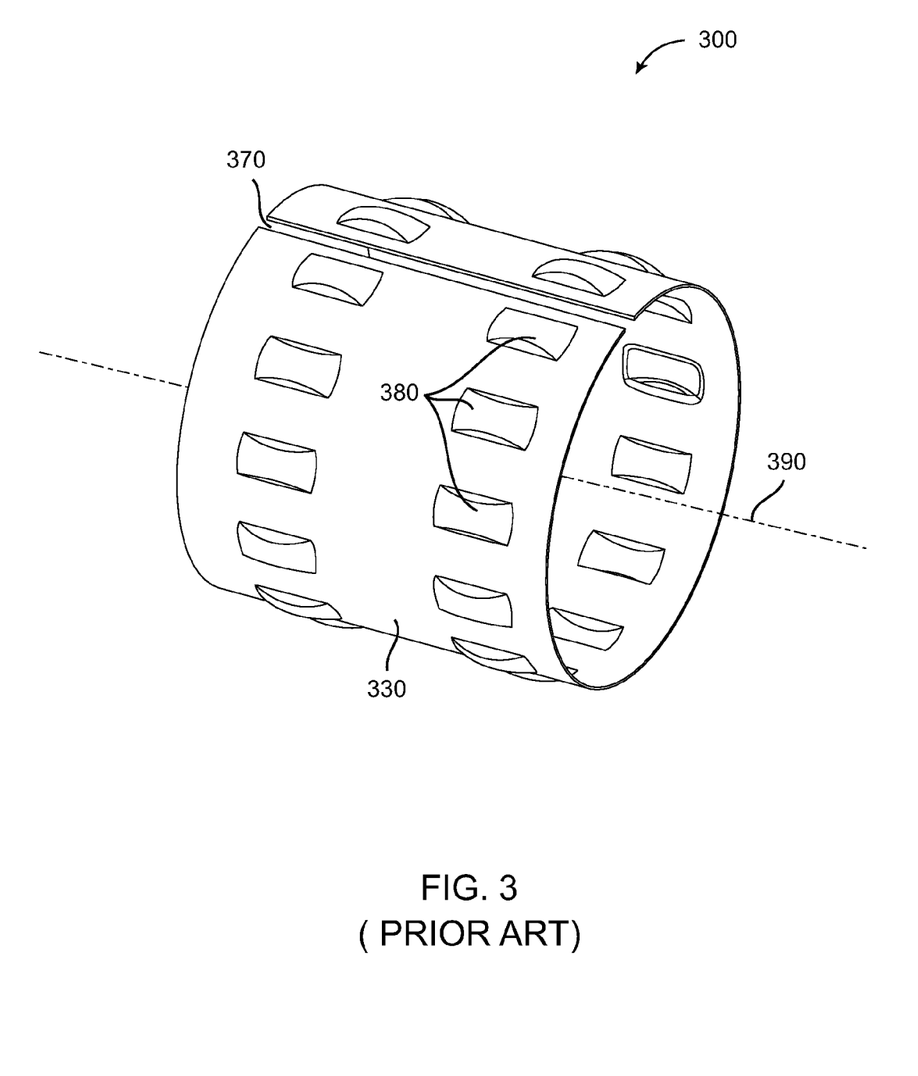
FIG. 3 is a perspective view of a contemporary tolerance ring for a disk drive actuator assembly.

FIG. 3 is a perspective view of a contemporary tolerance ring (i.e. interference band) 300 for a disk drive actuator assembly. The tolerance ring 300 comprises a substantially cylindrical sheet of steel (e.g. stainless steel) having a cylindrical base portion 330 and a plurality of bumps 380 that protrude radially. In this context, the radial direction is normal to a central axis 390 of the cylindrical base portion 330. Note that the central axis 390 of the cylindrical base portion 330 is approximately coincident with the actuator pivot axis. Radial expansion and contraction of the tolerance ring 300 is facilitated by a gap 370 in the circumference of the tolerance ring 300.

Figure 4A:
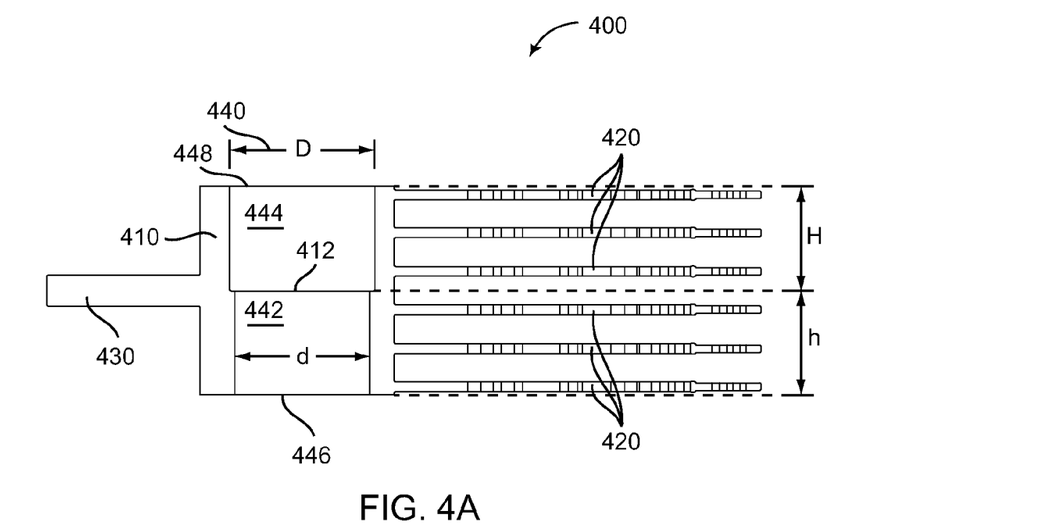
FIG. 4A depicts a cross-sectional view of a disk drive actuator according to an embodiment of the present invention.

FIG. 4A depicts a cross-sectional view of a disk drive actuator 400 according to an embodiment of the present invention. The actuator 400 includes an actuator body 410 and a plurality of actuator arms 420 extending from the actuator body 410. A coil support 430 also extends from the actuator body 410, in a direction that is generally opposite that of the actuator arms 420.

In the embodiment of FIG. 4A, the actuator body 410 includes a cylindrical bore 440 having a first axial end 446 and a second axial end 448. The cylindrical bore 410 has a first diameter d in a first region 442 adjacent the first axial end 446, and a second diameter D in a second region 444 adjacent the second axial end 448. In certain embodiments, each of the first diameter d and the second diameter D may preferably be in the range of 5 mm to 15 mm. A radial step 412 is disposed between the first region 442 and the second region 444. In the embodiment of FIG. 4A, the second diameter D is greater than the first diameter d, preferably by at least 20 microns but no more than 100 microns.

In the embodiment of FIG. 4A, the radial step 412 is not necessarily a 90 degree step. Rather, it may optionally be a transition over an axial transition extent that is no greater than 200 microns (e.g. may have a taper angle or even be curved within that axial transition extent). In certain embodiments, the first region 442 has an axial extent h that is at least ⅓rd of a total axial extent (h+H) of the cylindrical bore 440, but no more than ⅔rds of the total axial extent (h+H) of the cylindrical bore 440. Likewise in such embodiments, the second region 444 has an axial extent H that is at least ⅓rd of a total axial extent (h+H) of the cylindrical bore 440, but no more than ⅔rds of the total axial extent (h+H) of the cylindrical bore 440. For example, in the embodiment of FIG. 4A, each of H and h is optionally approximately half of the total axial extent (h+H) of the cylindrical bore 440.

In certain embodiments, these foregoing dimensional ranges for the axial extent h of the first region 442 and the axial extent H of the second region 444, may be critical, because they may ensure that a sufficient number of tolerance ring protrusions can contact each of the first and second regions 442, 444. If either the first or second regions 442, 444 has insufficient axial extent, the intended function of the radial step 412 (to change the boundary condition applied to the actuator by the tolerance ring, sufficiently to desirably affect one or more actuator mechanical resonances) may be defeated.

The radial step 412 in the embodiment of FIG. 4A may advantageously improve the mechanical resonance characteristics of the actuator 400, especially in the case where a pivot attachment of the actuator 400 adjacent the first end 446 (e.g. to a disk drive base), is more compliant than a pivot attachment of the actuator 400 adjacent the second end 448 (e.g. to a disk drive cover). Such unequal boundary conditions (stiffer attachment adjacent the second end 448 and more compliant attachment adjacent the first end 446), may move the dynamic center of a torsional or rocking resonance mode of the actuator 400 to be undesirably axially displaced from the actuator's geometric center. However, since the radial step 412 effectively reduces the tolerance ring clearance in the first portion 442, the radial step 412 may advantageously provide a boundary condition compensation—moving the dynamic center of a torsional or rocking resonance mode of the actuator 400 to be desirably axially closer to the actuator's geometric center.

The difference between the second diameter D and the first diameter d may be understood as being twice the radial step 412 (in an embodiment having a single radial step). Hence the radial step 412 preferably may be at least 10 microns but no more than 50 microns. In certain embodiments, the lower limit of this range may be critical because a smaller step may not significantly or adequately move the dynamic center of the mechanical torsion or rocking mode of the actuator 400, after disk drive assembly. In certain embodiments, the upper limit of this range may also be critical because a larger step may excessively move the dynamic center of the mechanical torsion or rocking mode of the actuator 400, after disk drive assembly. A substantially larger step may cause assembly difficulties, debris generation during disk drive assembly, and/or undesirable yielding of compressed protrusions of the tolerance ring. For example, a macroscopic step purposed for axial registration or retention of the tolerance ring or pivot bearing cartridge would likely be far too large to function for the purpose of the radial step 412 in FIG. 4A.

Figure 4B:
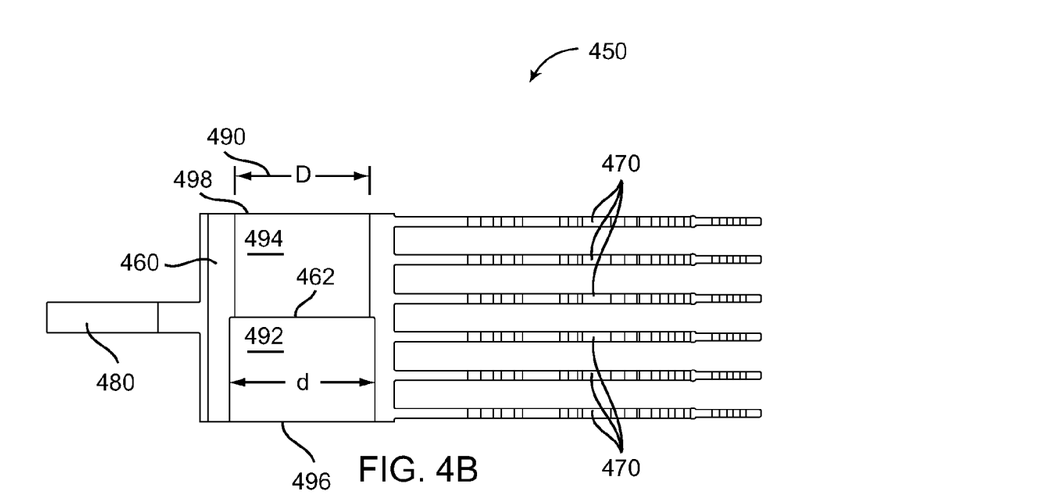
FIG. 4B depicts a cross-sectional view of a disk drive actuator according to another embodiment of the present invention.

FIG. 4B depicts a cross-sectional view of a disk drive actuator 450 according to another embodiment of the present invention. The actuator 450 includes an actuator body 460 and a plurality of actuator arms 470 extending from the actuator body 460. A coil support 480 also extends from the actuator body 460, in a direction that is generally opposite that of the actuator arms 470.

In the embodiment of FIG. 4B, the actuator body 460 includes a cylindrical bore 490 having a first axial end 496 and a second axial end 498. The cylindrical bore 490 has a first diameter d in a first region 492 adjacent the first axial end 496, and a second diameter D in a second region 494 adjacent the second axial end 498. In certain embodiments, each of the first diameter d and the second diameter D may preferably be in the range of 5 mm to 15 mm. A radial step 462 is disposed between the first region 492 and the second region 494. In the embodiment of FIG. 4B, the first diameter d is greater than the second diameter D, preferably by at least 20 microns but no more than 100 microns.

In the embodiment of FIG. 4B, the radial step 462 is not necessarily a 90 degree step. Rather, it may optionally be a transition over an axial transition extent that is no greater than 200 microns (e.g. may have a taper angle or even be curved within that axial transition extent).

The radial step 462 in the embodiment of FIG. 4B may advantageously improve the mechanical resonance characteristics of the actuator 450, especially in the case where a pivot attachment of the actuator 450 adjacent the first end 496 (e.g. to a disk drive base), is stiffer than a pivot attachment of the actuator 450 adjacent the second end 498 (e.g. to a disk drive cover). Such unequal boundary conditions (more compliant attachment adjacent the second end 498 and stiffer attachment adjacent the first end 496), may move the dynamic center of a torsional or rocking resonance mode of the actuator 450 to be undesirably axially displaced from the actuator's geometric center. However, since the radial step 462 effectively increases the tolerance ring clearance in the first portion 492, the radial step 462 may advantageously provide a boundary condition compensation—moving the dynamic center of a torsional or rocking resonance mode of the actuator 450 to be desirably axially closer to the actuator's geometric center.

The difference between the second diameter D and the first diameter d may be understood as being twice the radial step 462 (in an embodiment having a single radial step). Hence the radial step 462 preferably may be at least 10 microns but no more than 50 microns. In certain embodiments, the lower limit of this range may be critical because a smaller step may not significantly or adequately move the dynamic center of the mechanical torsion or rocking mode of the actuator 450, after disk drive assembly. In certain embodiments, the upper limit of this range may also be critical because a larger step may excessively move the dynamic center of the mechanical torsion or rocking mode of the actuator 450, after disk drive assembly. A substantially larger step may cause assembly difficulties, debris generation during disk drive assembly, and/or undesirable yielding of compressed protrusions of the tolerance ring. For example, a macroscopic step purposed for axial registration or retention of the tolerance ring or pivot bearing cartridge would likely be far too large to function for the purpose of the radial step 462 in FIG. 4B.

Figure 5:
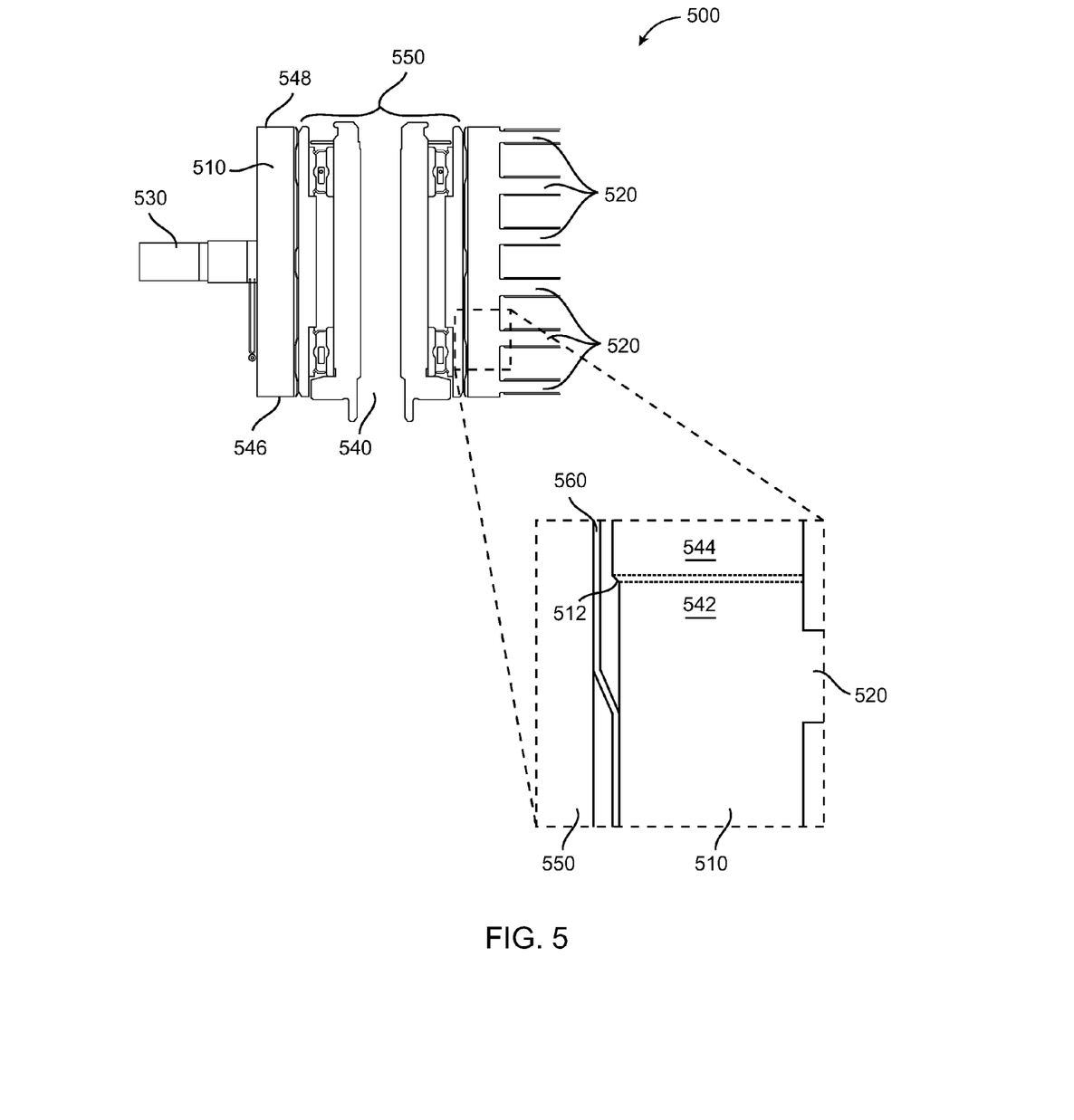
FIG. 5 depicts a cross sectional view of a head stack assembly (HSA) according to an embodiment of the present invention, including an expanded view of a region of interest.

FIG. 5 depicts a cross sectional view of a head stack assembly (HSA) 500 according to an embodiment of the present invention, including an expanded view of a region of interest. The HSA 500 includes an actuator body 510 and a plurality of actuator arms 520 extending from the actuator body 510. A coil support 530 also extends from the actuator body 510, in a direction that is generally opposite that of the actuator arms 520. In the embodiment of FIG. 5, the actuator body 510 includes a cylindrical bore 540 having a first axial end 546 and a second axial end 548. A pivot bearing cartridge 550 is disposed within the cylindrical bore 540, and held in place by a tolerance ring 560 that is radially preloaded between an outer surface of the pivot bearing cartridge 550 and an inner surface of the cylindrical bore 540 of the actuator body 510.

In the embodiment of FIG. 5, the cylindrical bore 540 has a greater diameter in a first region 542 adjacent the first axial end 546, and a lesser diameter in a second region 544 adjacent the second axial end 548. A radial step 512, preferably of 10 microns to 50 microns, is disposed in the inner surface of the cylindrical bore 540 between the first region 542 and the second region 544. As shown in FIG. 5, the radial step 512 is not necessarily a 90 degree step. Rather, it is shown to transition over a axial transition extent that preferably is no greater than 200 microns.

The radial step 512 in the embodiment of FIG. 5 may advantageously improve the mechanical resonance characteristics of the actuator HSA 500, especially in the case where a pivot attachment of the HSA 500 adjacent the first end 546 (e.g. to a disk drive base), is stiffer than a pivot attachment of the HSA 500 adjacent the second end 548 (e.g. to a disk drive cover). Such unequal boundary conditions (more compliant attachment adjacent the second end 548 and stiffer attachment adjacent the first end 546), may move the dynamic center of a torsional or rocking resonance mode of the HSA 500 to be undesirably axially displaced from the HSA's geometric center. However, since the radial step 512 effectively increases the tolerance ring clearance in the first portion 542, the radial step 512 may advantageously provide a boundary condition compensation—moving the dynamic center of a torsional or rocking resonance mode of the HSA 500 to be desirably axially closer to the HSA's geometric center.

In certain embodiments, it may be critical that the step 512 not be smaller than 10 microns, because a smaller step may not significantly or adequately move the dynamic center of the mechanical torsion or rocking mode of the HSA 500, after disk drive assembly. In certain embodiments, it may be critical that the step 512 not be larger than 50 microns, because a larger step may excessively move the dynamic center of the mechanical torsion or rocking mode of the HSA 500, after disk drive assembly. A substantially larger step may cause HSA assembly difficulties, debris generation during HSA assembly, and/or undesirable yielding of compressed protrusions of the tolerance ring. For example, a macroscopic step purposed for axial registration or retention of the tolerance ring 560 or pivot bearing cartridge 550 would likely be far too large to function for the purpose of the radial step 512 in FIG. 5.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:
1. A disk drive, comprising:
a disk drive base;
a cover attached to the disk drive base to define a disk drive enclosure;
a disk rotatably attached to the disk drive base and disposed within the disk drive enclosure;
a head stack assembly (HSA) disposed within the disk drive enclosure, the HSA including:
an actuator body having a cylindrical bore therethrough and an actuator arm extending therefrom;
a head attached to a distal end of the actuator arm;

a pivot bearing cartridge disposed within the cylindrical bore and having a first end that is attached to the disk drive base; and a tolerance band radially preloaded between an outer surface of the pivot bearing cartridge and an inner surface of the cylindrical bore;

wherein the cylindrical bore has a first diameter in a first region adjacent the disk drive base, and a second diameter in a second region adjacent the cover, and a radial step between the first and second regions, the first diameter being different from the second diameter by a diameter difference that is in the range of 20 microns to 100 microns.

2. The disk drive of claim 1 wherein the pivot bearing cartridge has a second end that is attached to the disk drive cover, wherein the attachment of the second end is more compliant than the attachment of the first end, and wherein the first diameter is greater than the second diameter.

3. The disk drive of claim 1 wherein the pivot bearing cartridge has a second end that is attached to the disk drive cover, wherein the attachment of the first end is more compliant than the attachment of the second end, and wherein the second diameter is greater than the first diameter.

4. The disk drive of claim 1 wherein the radial step is at least 10 microns but no more than 50 microns, over an axial transition extent that is no greater than 200 microns.

5. The disk drive of claim 1 wherein the first region has an axial extent that is at least $\frac{1}{3}^{rd}$ of a total axial extent of the cylindrical bore, but no more than $\frac{2}{3}^{rds}$ of the total axial extent of the cylindrical bore.

6. The disk drive of claim 5 wherein the first region extends for approximately half of a total axial extent of the cylindrical bore, and the second region extends for approximately half of the total axial extent of the cylindrical bore.

7. The disk drive of claim 1 wherein the first diameter and the second diameter are in the range of 5 mm to 15 mm.

8. The disk drive of claim 1 wherein the actuator body comprises aluminum and the tolerance band comprises a substantially cylindrical sheet of steel having a plurality of radial protrusions that are deformed by the radial preload.

9. A head stack assembly (HSA) for disk drive, the HSA comprising:

an actuator body having a cylindrical bore therethrough and an actuator arm extending therefrom;

a head attached to a distal end of the actuator arm;

a pivot bearing cartridge disposed within the cylindrical bore and having first and second axial ends; and a tolerance band radially preloaded between an outer surface of the pivot bearing cartridge and an inner surface of the cylindrical bore;

wherein the cylindrical bore has a first diameter in a first region adjacent the first axial end, and a second diameter in a second region adjacent the second axial end, and a radial step between the first and second regions, the first diameter being different from the second diameter by a diameter difference that is in the range of 20 microns to 100 microns.

10. The HSA of claim 9 wherein the first diameter is greater than the second diameter.

11. The HSA of claim 9 wherein the second diameter is greater than the first diameter.

12. The HSA of claim 9 wherein the radial step is at least 10 microns but no more than 50 microns, over an axial transition extent that is no greater than 200 microns.

13. The HSA of claim 9 wherein the first region has an axial extent that is at least $\frac{1}{3}^{rd}$ of a total axial extent of the cylindrical bore, but no more than $\frac{2}{3}^{rds}$ of the total axial extent of the cylindrical bore.

14. The HSA of claim 9 wherein the first region extends for approximately half of a total axial extent of the cylindrical bore, and the second region extends for approximately half of the total axial extent of the cylindrical bore.

15. The HSA of claim 9 wherein the first diameter and the second diameter are in the range of 5 mm to 15 mm.

16. The HSA of claim 9 wherein the actuator body comprises aluminum and the tolerance band comprises a substantially cylindrical sheet of steel having a plurality of radial protrusions that are deformed by the radial preload.

17. An actuator comprising:

an actuator body;

an actuator arm extending from the actuator body;

the actuator body including a cylindrical bore having first and second axial ends;

wherein the cylindrical bore has a first diameter in a first region adjacent the first axial end, and a second diameter in a second region adjacent the second axial end, and a radial step between the first and second regions, the first diameter being greater than the second diameter by at least 20 microns but no more than 100 microns.

18. The actuator of claim 17 wherein the radial step is at least 10 microns but no more than 50 microns, over an axial transition extent that is no greater than 200 microns.

19. The actuator of claim 17 wherein the first region has an axial extent that is at least $\frac{1}{3}^{rd}$ of a total axial extent of the cylindrical bore, but no more than $\frac{2}{3}^{rds}$ of the total axial extent of the cylindrical bore.

20. The actuator of claim 17 wherein the first diameter and the second diameter are in the range of 5 mm to 15 mm.

\* \* \* \* \*